(12) United States Patent
Khan et al.

(10) Patent No.: US 12,550,034 B2
(45) Date of Patent: Feb. 10, 2026

(54) CONTROL PLANE AND USER PLANE RECONNECTION

(71) Applicant: Boost SubscriberCo L.L.C., Englewood, CO (US)

(72) Inventors: Abbas Khan, Littleton, CO (US); Jeffrey McSchooler, Parker, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 269 days.

(21) Appl. No.: 18/136,766

(22) Filed: Apr. 19, 2023

(65) Prior Publication Data

US 2024/0357459 A1 Oct. 24, 2024

(51) Int. Cl.
*H04W 36/30* (2009.01)
*H04W 76/19* (2018.01)

(52) U.S. Cl.
CPC ......... *H04W 36/305* (2018.08); *H04W 76/19* (2018.02)

(58) Field of Classification Search
CPC ............................ H04W 36/305; H04W 76/19
See application file for complete search history.

(56) References Cited

U.S. PATENT DOCUMENTS

| | | | | |
|---|---|---|---|---|
| 9,504,081 B2 * | 11/2016 | Anderson | ............. | H04W 72/23 |
| 10,642,702 B1 * | 5/2020 | Khan | ....................... | H04L 69/40 |
| 2006/0056333 A1 * | 3/2006 | Ogura | ................... | H04W 88/12 |
| | | | | 370/328 |
| 2015/0223106 A1 | 8/2015 | Van Phan et al. | | |
| 2015/0245402 A1 | 8/2015 | Mochizuki et al. | | |
| 2018/0227980 A1 | 8/2018 | Uchino et al. | | |
| 2022/0377826 A1 * | 11/2022 | He | ........................ | H04W 76/12 |
| 2023/0319542 A1 * | 10/2023 | Takano | .................. | H04W 76/22 |
| | | | | 370/329 |
| 2023/0337311 A1 * | 10/2023 | Teyeb | ................... | H04W 76/19 |

FOREIGN PATENT DOCUMENTS

WO 2022/066071 A1 3/2022

OTHER PUBLICATIONS

International Search Report and Written Opinion received for PCT Patent Application No. PCT/US24/21779, mailed on Jul. 15, 2024, 16 pages.

\* cited by examiner

*Primary Examiner* — Kenny S Lin
(74) *Attorney, Agent, or Firm* — Kipman T. Werking; Frontier IP Law PLLC (57) ABSTRACT

A disclosed method may include (i) checking whether a user plane of a cellular service network connection to a user equipment is operational, (ii) checking whether a control plane of the same cellular service network connection to the user equipment is operational, (iii) determining that one of the user plane and control plane is operational while the other of the user plane and the control plane is not operational such that the cellular service network connection is stalled, and (iv) remediating the cellular service network connection by disabling the one of the user plane and control plane that is operational such that a new cellular service network connection is established. Related systems and computer-readable mediums are further disclosed.

20 Claims, 9 Drawing Sheets

CONTROL PLANE AND USER PLANE RECONNECTION

BRIEF SUMMARY

This application is generally directed to control plane and user plane reconnection, as discussed in more detail below. In one example, a method may include (i) checking whether a user plane of a cellular service network connection to a user equipment is operational, (ii) checking whether a control plane of the same cellular service network connection to the user equipment is operational, (iii) determining that one of the user plane and control plane is operational while the other of the user plane and the control plane is not operational such that the cellular service network connection is stalled, and (iv) remediating the cellular service network connection by disabling the one of the user plane and control plane that is operational such that a new cellular service network connection is established.

In some examples, the user plane of the cellular service network connection to the user equipment is operational and the control plane of the cellular service network connection to the user equipment is not operational such that the cellular service network connection is stalled.

In some examples, the control plane of the cellular service network connection to the user equipment is operational and the user plane of the cellular service network connection to the user equipment is not operational such that the cellular service network connection is stalled.

In some examples, disabling the one of the user plane and control plane that is operational is performed by the user equipment.

In some examples, disabling the one of the user plane and the control plane that is operational results in the user equipment connecting to a different cellular base station.

In some examples, disabling the one of the user plane and the control plane that is operational is performed at a cellular base station to which the user equipment is connected.

In some examples, disabling the one of the user plane and the control plane that is operational is performed by disabling a sector of the cellular base station to which the user equipment is connected.

In some examples, the cellular service network connection is stalled such that the user equipment appears to be connected to a cellular base station while failing to respond to user input at the user equipment.

In some examples, the cellular service network connection is formatted according to a protocol that disaggregates the user plane and the control plane.

In some examples, the cellular service network connection comprises a 5G cellular service network connection.

In some examples, a system may include at least one processor and at least one memory coupled to the at least one processor, the at least one memory having computer-executable instructions stored thereon that, when executed by the at least one processor, cause actions to be performed, the actions including: (i) checking whether a user plane of a cellular service network connection to the user equipment is operational, (ii) checking whether a control plane of the same cellular service network connection to the user equipment is operational, (iii) determining that one of the user plane and control plane is operational while the other of the user plane and the control plane is not operational such that the cellular service network connection is stalled, and (iv) remediating the cellular service network connection by disabling the one of the user plane and control plane that is operational such that a new cellular service network connection is established.

In some examples, a non-transitory computer-readable medium encodes instructions that, when executed by at least one physical processor of a computing device, cause the computing device to perform a method comprising (i) checking whether a user plane of a cellular service network connection to a user equipment is operational, (ii) checking whether a control plane of the same cellular service network connection to the user equipment is operational, (iii) determining that one of the user plane and control plane is operational while the other of the user plane and the control plane is not operational such that the cellular service network connection is stalled, and (iv) remediating the cellular service network connection by disabling the one of the user plane and control plane that is operational such that a new cellular service network connection is established.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings:

FIG. 7 shows a flow diagram for an example method in which a sector of a cellular base station is disabled. FIG. 7 elaborates on the main flow diagram of FIG. 1, but with a focus on the decision process being performed at the base station rather than the user equipment.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
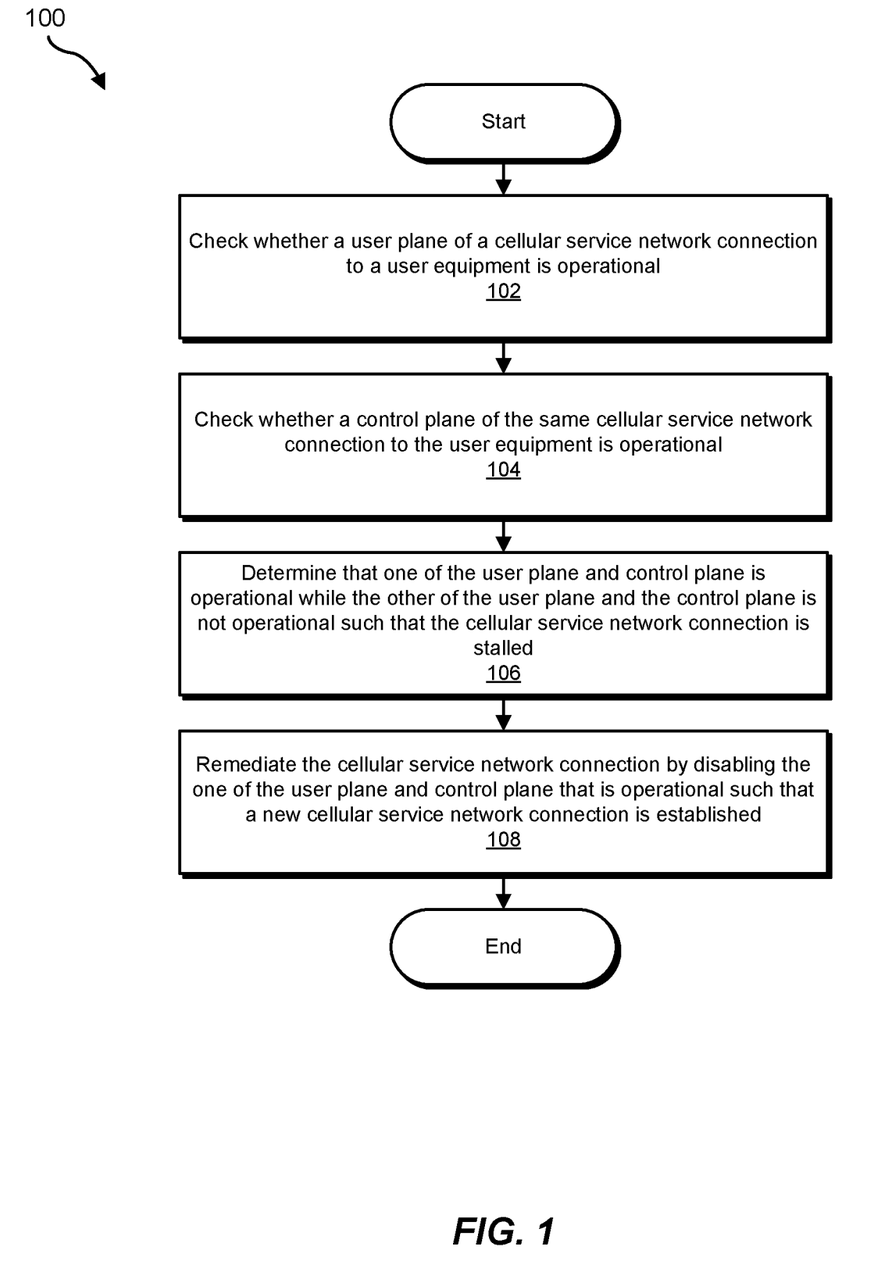
FIG. 1 shows a flow diagram for an example method for control plane and user plane reconnection. The flow diagram may parallel the independent claims of this application.

FIG. 1 shows an example method 100 for control plane and user plane reconnection. At step 102, one or more of the methods described herein may check whether a user plane of a cellular service network connection to a user equipment is operational. At step 104, one or more of the systems described herein may check whether a control plane of the same cellular service network connection to the user equipment is operational. At step 106, one or more of the systems described herein may determine that one of the user plane and control plane is operational while the other of the user plane and the control plane is not operational such that the cellular service network connection is stalled. Lastly, at step 108, one or more of the systems described herein may remediate the cellular service network connection by disabling the one of the user plane and control plane that is operational such that a new cellular service network connection is established. The performance of method 100, as well as the details of various embodiments implementing method 100, will be discussed in more detail below in connection with FIGS. 2-8.

Figure 2:
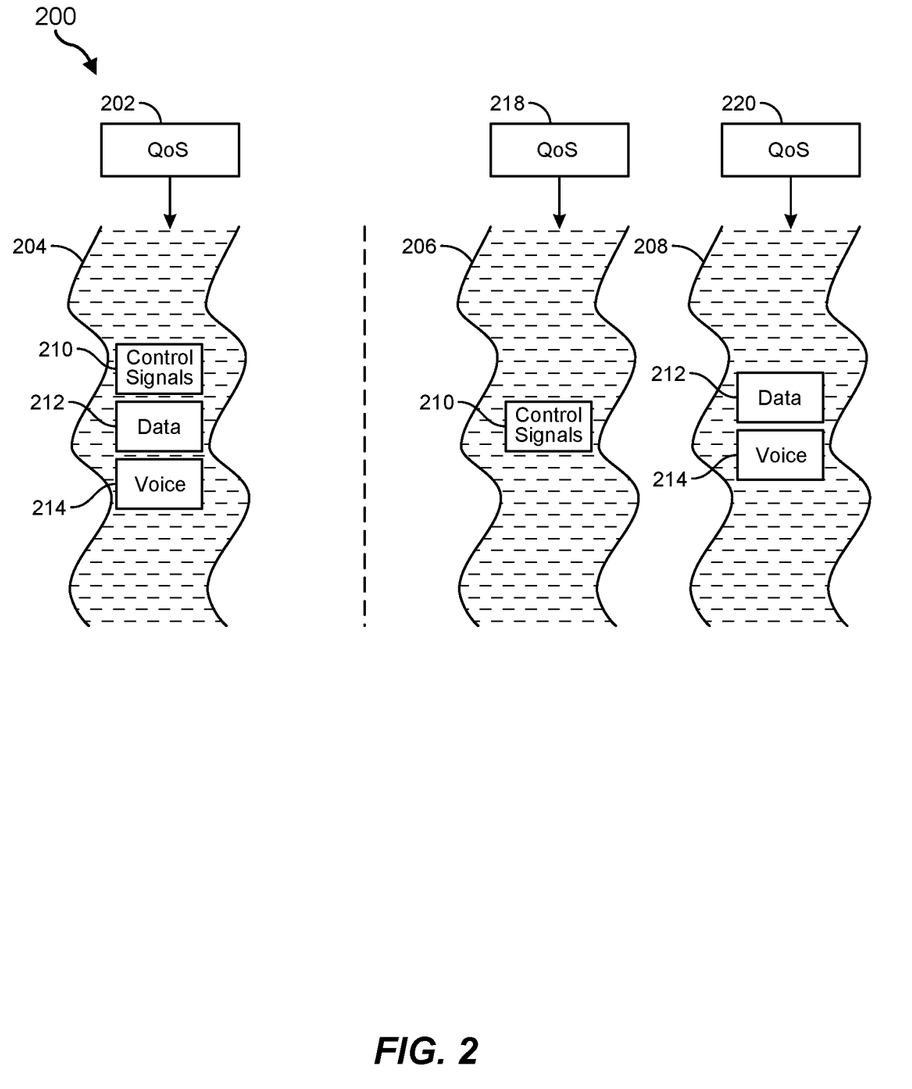
FIG. 2 shows a diagram illustrating the disaggregation of a control plane and the user plane within a cellular service network connection.

FIG. 2 shows a diagram 200 that helps to illustrate the disaggregation of the control plane and user plane within a cellular service network connection. On the left-hand side of this figure, a stream 204 figuratively represents a network flow that contains at least three types of data, control signals 210, data 212, and voice 214. Control signals 210 correspond to signals or background processes for maintaining and administering the overall cellular service network connection. Accordingly, control signals 210 are generally initiated by the network itself or the corresponding cellular service network provider. Illustrative examples of such control signals may include signals for authorizing a user equipment, updating the user equipment, and/or applying one or more security patches, etc. Control signals 210 correspond to the control plane discussed throughout this application.

In contrast, data 212 and voice 214 generally correspond to network communications initiated by the user at the user equipment when interacting with the overall wide area network such as the Internet. Accordingly, requests to access a website over the Internet and/or telephone or videoconference calls initiated by the user would correspond to data 212 and voice 214, respectively, as illustrative examples of such items of data. These items generally correspond to the user plane discussed throughout this application.

As further shown in FIG. 2, control signals 210, data 212, and voice 214 are all included within the same stream 204 of network communications. Because all of these items of information are included within the same stream, only a single quality of service policy 202 on the left-hand side of this figure would apply to all of them in the aggregate. In other words, all of these items of information are aggregated within the same network flow of information. The configuration of stream 204, in which all of these items of information are aggregated together, can generally correspond to 3G and 4G cellular service network connections.

In contrast to the 3G and 4G cellular service network connections of stream 204, the right-hand side of FIG. 2 further illustrates a pair of streams, stream 206 and stream 208, which figuratively represent two separate network flows, and in which the items of information listed above have been disaggregated. Accordingly, stream 206 may include control signals 210 whereas a different stream 208 may include data 212 and voice 214. The disaggregated configuration of stream 206 and stream 208 generally corresponds to 5G cellular service network connections, as discussed in more detail below. Moreover, the disaggregation of these items of information into two separate network flows enables the beneficial result of applying a separate quality of service policy 220 to stream 206 from a different quality of service policy 220 applied to stream 208.

The disaggregation of the control plane from the user plane is simply one example of several different types of disaggregation within the context of a 5G network system. In combination, several different types of disaggregation provide significant benefits in comparison to related systems.

Generally speaking, disaggregation in a 5G network system refers to the separation of hardware and software components, enabling network operators to use different vendors' equipment to build a complete system. One significant benefit of disaggregation in a 5G network system is improved flexibility and scalability. With disaggregation, network operators can easily swap out and upgrade individual components of the system without having to replace the entire network. This means that they can choose the best equipment and software for each specific use case, leading to better performance and lower costs.

Another advantage of disaggregation in a 5G network system is increased innovation and competition. When operators are not locked into using a single vendor's equipment, it creates a more competitive market where vendors must constantly innovate and improve their products to stay ahead. This ultimately leads to better and more affordable equipment, which benefits both the network operators and their customers. Additionally, disaggregation encourages the development of open standards, which facilitates interoperability and promotes a more collaborative environment in the industry.

Furthermore, disaggregation in a 5G network system can enhance security and reliability. By allowing network operators to use multiple vendors' equipment, the system becomes less vulnerable to single-point failures. In addition, disaggregation enables network operators to customize their security protocols to better meet their specific needs. This flexibility allows them to implement security measures that are tailored to their particular use case, rather than relying on a one-size-fits-all approach. Overall, disaggregation in a 5G network system provides numerous benefits that can improve performance, lower costs, promote innovation, and enhance security and reliability.

Figure 3:
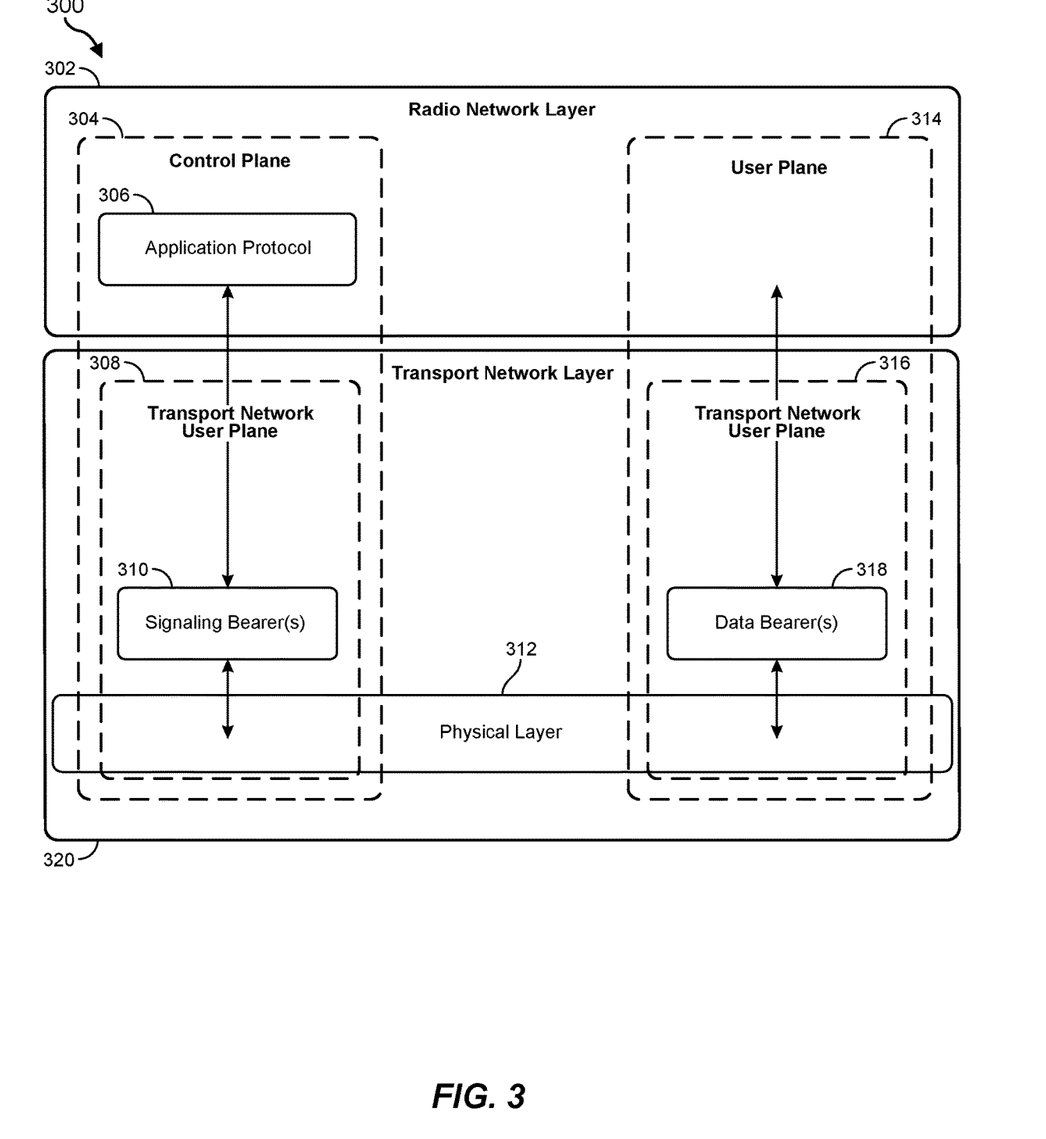
FIG. 3 shows a diagram illustrating the relationship between the control plane and the user plane in terms of a radio network layer and a transport network layer. More generally, this figure provides basic background knowledge of the interaction between the control plane and the user plane.

To further illustrate the relationship between the control plane and the user plane, FIG. 3 shows a diagram 300 that includes a radio network layer 302 and a transport network layer 320. Branching between these two layers are control plane 304 (including a transport network user plane 308) and the user plane 314 (including a transport network user plane 316). This figure also further illustrates the relationship between these layers and an application protocol 306, signaling bearer(s) 310, data bearer(s) 318, and a physical layer 312.

Generally speaking, the user plane can also be referred to as the forwarding plane, the data plane, the bearer plane, or the carrier plane. The user plane generally carries user traffic. In contrast, the control plane can carry control network packets that are starting from, or are directed to, a particular network router. The user plane can include information about the content that is transmitted by, or targeted to, the user, which can include voice, websites, videos, messages, etc. In contrast, the control plane generally facilitates the administration of the corresponding network, including login credentials, passwords, encryption keys, and/or payment services.

Figure 4:
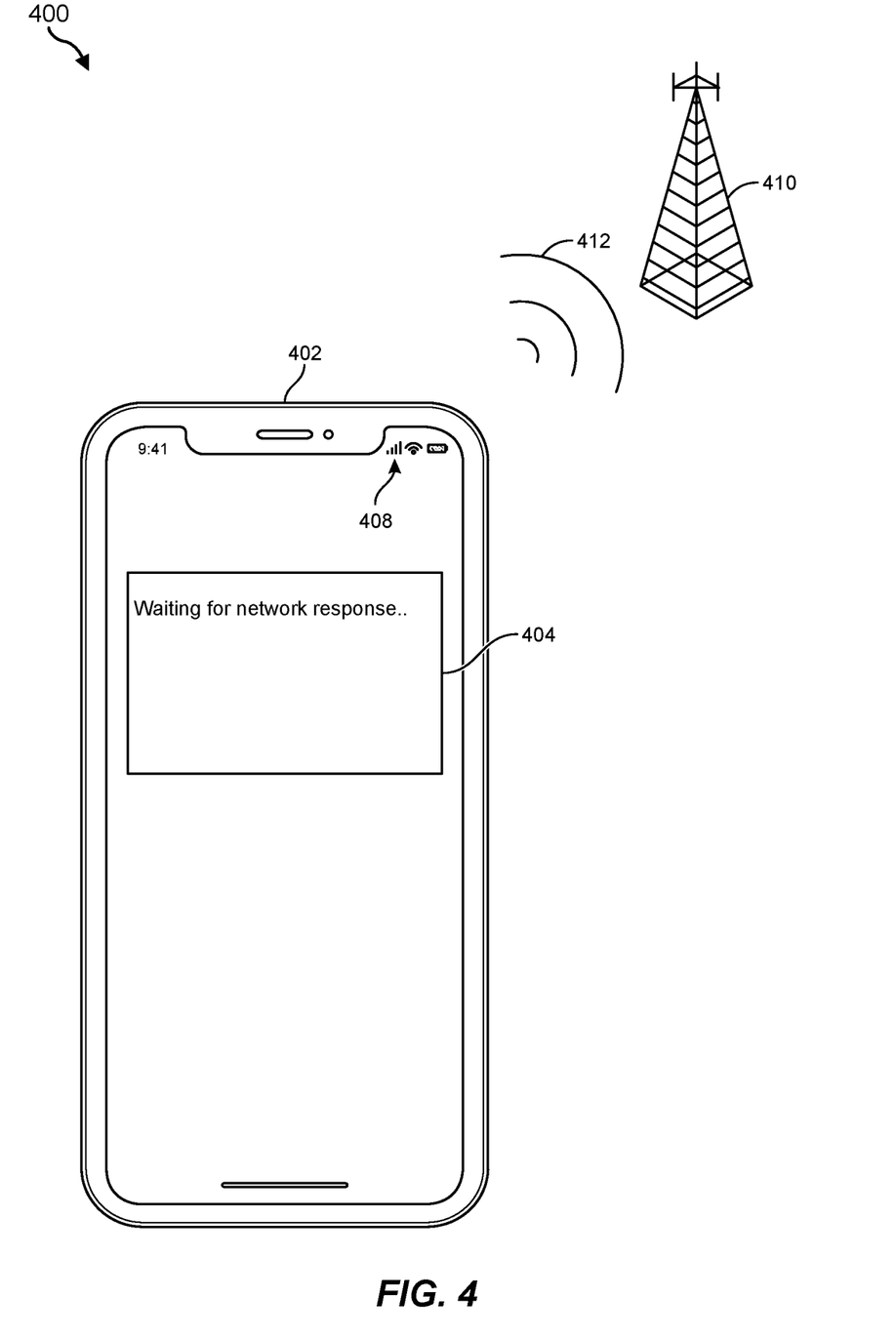
FIG. 4 shows a diagram of the graphical user interface of a smartphone connected to a cellular base station. In particular, this figure illustrates the interaction between a user equipment (e.g., smartphone) and a cellular base station when one of the control plane or user plane stalls, thereby creating a user experience of no network connection.

FIG. 4 shows a diagram 400 of a graphical user interface for a smartphone 402 having at least a partial connection 412 to a cellular base station 410. The graphical user interface may further include a cellular connection icon 408 and a web browser notification 404.

Diagram 400 can further illustrate a dilemma that can arise in the context of 5G cellular network connections that disaggregate the control plane and the user plane, as further outlined above. In particular, in certain scenarios only a single one of the pair of planes, the user plane and the control plane, might be inoperable, malfunctioning, or otherwise unavailable, while the other one of these two remains functioning. The failure of one of these two planes can prevent the overall cellular service network connection from operating properly. For example, attempts by the user to access a particular website might result in a failure of the cellular service network connection to respond appropriately. This is indicated in FIG. 4 by web browser notification 404, which states "Waiting for network response . . . ." The example of this figure is merely illustrative and, in other scenarios, a different output from the graphical user interface may be indicative of the same general failure of the overall cellular service network connection to function properly.

Despite the fact that the overall cellular service network connection is failing to function properly, the system may fail to recognize this fact. In other words, the proper functioning of the remaining one of the two planes, between the control plane and the user plane, might be sufficient in some scenarios for the system to incorrectly ascertain that the overall cellular service network connection is functioning properly. This is indicated, for example, by cellular connection icon 408, which might indicate a full set of bars corresponding to a robust or strong cellular service network connection. Again, the example of cellular connection icon 408 is merely used as an illustrative example of this dilemma, and in other scenarios a different indicator from the graphical user interface may represent the malfunctioning of the cellular service network connection, as described above.

Figure 5:
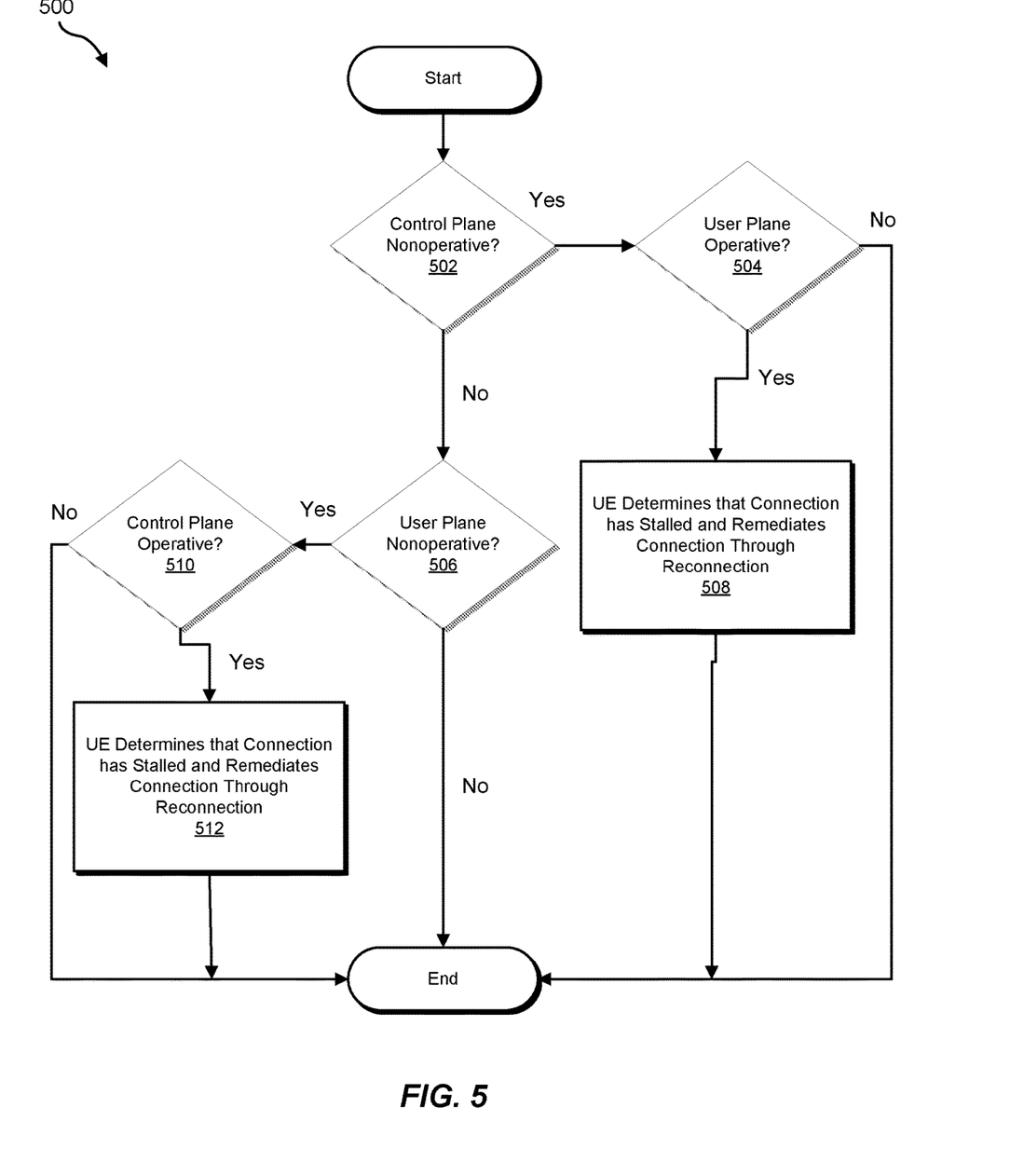
FIG. 5 shows a flow diagram for an example method in which a user equipment connects to a different cellular base station. This flow diagram elaborates on the main flow diagram of FIG. 1, but with a focus on the decision process being performed by the user equipment itself.

FIG. 5 shows a flow diagram for an example method 500, which can be performed by an item of user equipment consistent with method 100 described above. At step 502, the item of user equipment can check whether the control plane of the corresponding cellular service network connection is nonoperative. If it is, at step 504 the user equipment can check whether the user plane is operative, thereby indicating that only one of the two planes is inoperative, which further indicates that the cellular service network connection has stalled, as outlined above. In that case, at step 508, the user equipment determines that the cellular service network connection has stalled and remediates the connection through a reconnection procedure. For example, the user equipment can disable the user plane, which was otherwise operating normally, thereby triggering the user equipment to attempt reconnection with a different cellular base station, which is also further discussed below in the context of FIG. 6.

If the determination is no at decision step 502, then method 500 may proceed to decision step 506, at which point the user equipment can determine whether the user plane is nonoperative. If the decision is yes at step 506, then method 500 can proceed to decision step 510, at which point the user equipment determines whether the control plane is operative, thereby indicating another form of the stalling scenario discussed above. If the network connection has stalled, then at step 512, the user equipment determines this fact and remediates the connection through a reconnection procedure (e.g., by disabling the control plane). Alternatively, if the checks performed as part of method 500 do not indicate that the connection has stalled, method 500 may end, as shown in FIG. 5.

Figure 6:
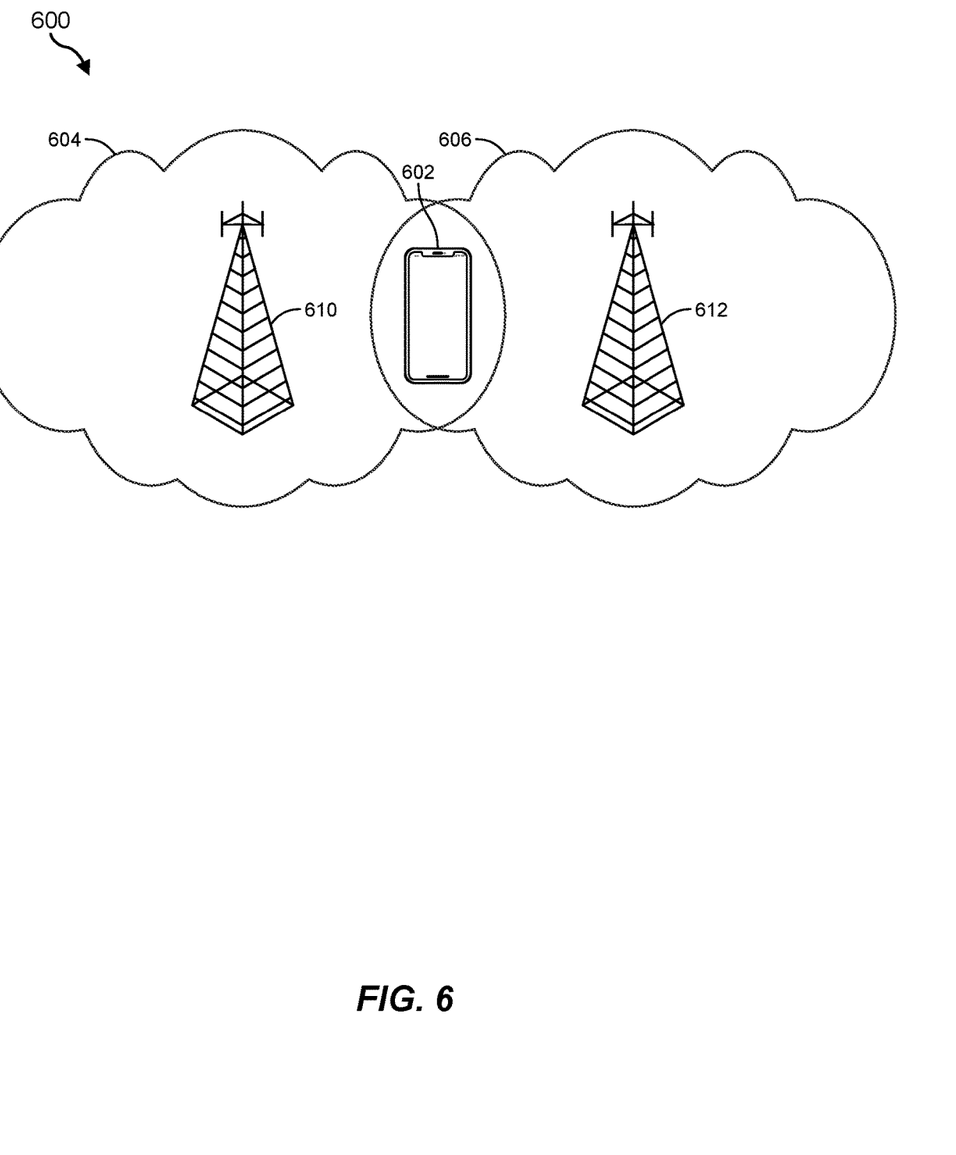
FIG. 6 shows a diagram illustrating how a user equipment can reconnect to a different cellular base station. In particular, FIG. 6 corresponds to FIG. 5 (i.e., an embodiment where the user equipment is making decisions), and illustrates how a user equipment can switch from one base station to a different base station when they are both overlapping with the user equipment.

FIG. 6 shows a diagram that further illustrates an example of the performance of method 500. As further shown in this figure, a smartphone 602 may be reachable or connectable to two separate cellular base stations, a cellular base station 610 and a cellular base station 612. As part of the performance of method 500, smartphone 602 can detect that the connection with one of these cellular base stations, such as cellular base station 610, has stalled, as outlined above. In response to this determination, smartphone 602 can be embedded with software or intelligence to remediate its connection to a wide area network such as the Internet by intentionally disconnecting from that particular cellular base station. For example, smartphone 602 can intentionally disable the one plane of the two planes, between the control plane and the user plane, that is still operable and thereby preventing the overall cellular service system from properly ascertaining that the cellular service network connection has stalled, as further discussed above.

In response, smartphone 602 can subsequently attempt to reconnect to the wide area network through a different cellular base station, such as cellular base station 612. In some examples, the connection to cellular base station 610 may represent a primary or non-roaming cellular service network connection, whereas the connection to cellular base station 612 may represent a roaming cellular service network connection through a different cellular service provider. In other examples, both cellular base stations may correspond to the same cellular service provider. Generally speaking, the subsequent cellular base station to which smartphone 602 reconnects may provide the strongest cellular connection signal from among a plurality of alternative cellular base stations that are remaining after the disconnection from cellular base station 610.

Figure 7:
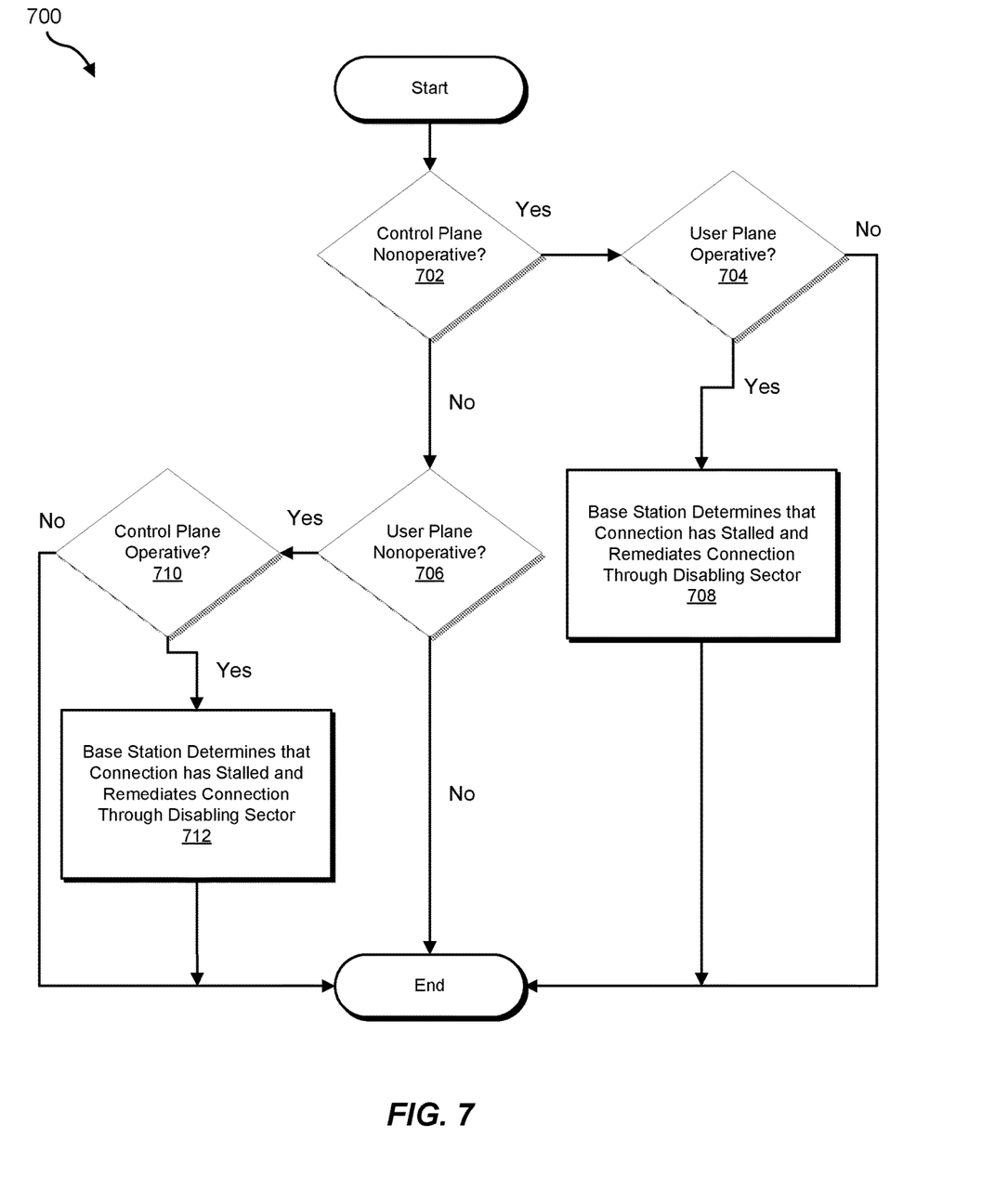

FIG. 7 shows a flow diagram for an example method that substantially parallels method 500, except that method 700 may be performed additionally, or alternatively, to method 500, and may be performed by the cellular base station rather than the item of user equipment. Accordingly, at step 708 and 712, which parallel step 508 and step 512 of method 500, the corresponding cellular base station to which the user equipment is at least partially connected as part of a stalled cellular service network connection, as discussed above, can attempt to remediate stalling scenario by disabling the entire cellular base station, or basically disabling the particular sector to which the user equipment is connected. Method 700 can be performed, for example, when the control plane for the sector where cellular base station has become nonoperative, in which case it will be nonoperative for all of the items of user equipment that are connected to that particular cellular base station, or connected to the particular sector of the cellular base station. In this scenario, all of the items of user equipment will be experiencing a stalled scenario and, therefore, all of these items of user equipment will benefit from the remediation procedure outlined in FIG. 7.

Figure 8:
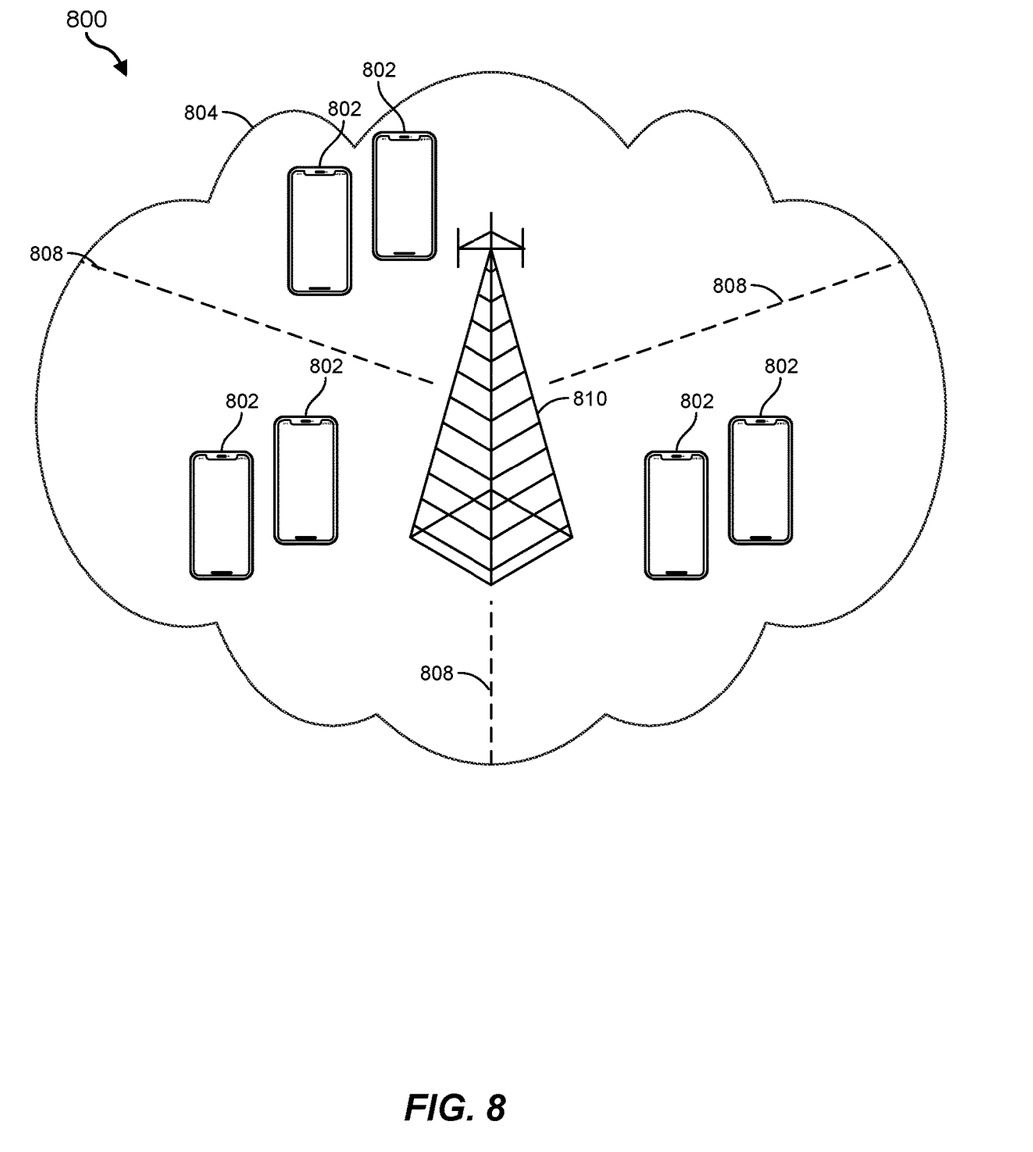
FIG. 8 shows a diagram illustrating how a sector of a cellular base station is disabled. In particular, FIG. 8 corresponds to FIG. 7 and shows how a single base station can disable an entire sector in response to detecting that one of the control plane or user plane has been disabled.

FIG. 8 shows a diagram 800 that helps to illustrate the performance of method 700, as discussed above. Diagram 800 may include a cellular base station 810, which includes three sectors highlighted by three instances of a divider line 808. Within these three different sectors are different instances of smartphone 802. By way of illustrative example, the control plane for one of the sectors may be detected by the cellular base station as nonoperative. In that case, all of the instances of smartphone 802 may be experiencing a stalled scenario in which the respective smartphones appear to have a cellular service network connection, and yet the connection is effectively nonresponsive to user input, as discussed above. In that case, the cellular base station can simply disable the control plane for that particular sector, which can trigger the various smartphones or other items of user equipment to attempt reconnection with a different sector or attempt reconnection with a different cellular base station, in a manner that is parallel to the discussion of FIG. 6 above, for example.

Figure 9:
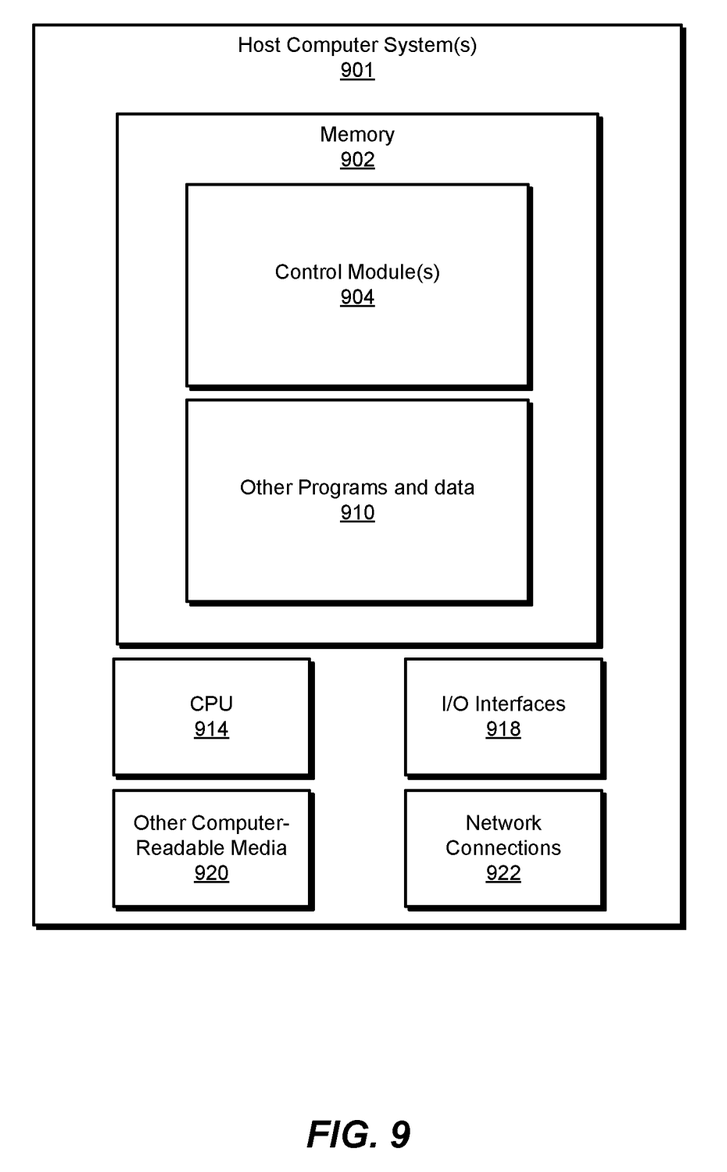
FIG. 9 shows a diagram of an example computing system that may facilitate the performance of various ones of the methods described herein.

FIG. 9 shows a system diagram that describes an example implementation of a computing system(s) for implementing embodiments described herein. The functionality described herein can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they are agnostic to the underlying cloud infrastructure, allowing higher deployment agility and flexibility. However, FIG. 9 illustrates an example of underlying hardware on which such software and functionality may be hosted and/or implemented.

In particular, shown is example host computer system(s) 901. For example, such host computer system(s) 901 may execute a scripting application, or other software application, to perform method 100, as further discussed above, and/or to perform one or more of the other methods described herein. In some embodiments, one or more special-purpose computing systems may be used to implement the functionality described herein. Accordingly, various embodiments described herein may be implemented in software, hardware, firmware, or in some combination thereof. Host computer system(s) 901 may include memory 902, one or more central processing units (CPUs) 914, I/O interfaces 918, other computer-readable media 920, and network connections 922.

Memory 902 may include one or more various types of non-volatile and/or volatile storage technologies. Examples of memory 902 may include, but are not limited to, flash memory, hard disk drives, optical drives, solid-state drives, various types of random access memory (RAM), various types of read-only memory (ROM), neural networks, other computer-readable storage media (also referred to as processor-readable storage media), or the like, or any combination thereof. Memory 902 may be utilized to store information, including computer-readable instructions that are utilized by CPU 914 to perform actions, including those of embodiments described herein.

Memory 902 may have stored thereon control module(s) 904. The control module(s) 904 may be configured to implement and/or perform some or all of the functions of the systems or components described herein. Memory 902 may also store other programs and data 910, which may include rules, databases, application programming interfaces (APIs), software containers, nodes, pods, clusters, node groups, control planes, software defined data centers (SDDCs), microservices, virtualized environments, software platforms, cloud computing service software, network management software, network orchestrator software, network functions (NF), artificial intelligence (AI) or machine learning (ML) programs or models to perform the functionality described herein, user interfaces, operating systems, other network management functions, other NFs, etc.

Network connections 922 are configured to communicate with other computing devices to facilitate the functionality described herein. In various embodiments, the network connections 922 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 918 may include a video interface, other data input or output interfaces, or the like. Other computer-readable media 920 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:
checking whether a user plane of a cellular service network connection to a user equipment is operational;
checking whether a control plane of the same cellular service network connection to the user equipment is operational;
determining that one of the user plane and control plane is operational while the other of the user plane and the control plane is not operational such that the cellular service network connection is stalled; and
remediating the cellular service network connection by disabling the one of the user plane and control plane that is operational such that a new cellular service network connection is established;
wherein:
disabling the one of the user plane and the control plane that is operational is performed at a cellular base station to which the user equipment is connected; and
disabling the one of the user plane and the control plane that is operational is performed by disabling a sector of the cellular base station to which the user equipment is connected.

2. The method of claim 1, wherein the user plane of the cellular service network connection to the user equipment is operational and the control plane of the cellular service network connection to the user equipment is not operational such that the cellular service network connection is stalled.

3. The method of claim 1, wherein the control plane of the cellular service network connection to the user equipment is operational and the user plane of the cellular service network connection to the user equipment is not operational such that the cellular service network connection is stalled.

4. The method of claim 1, wherein disabling the one of the user plane and the control plane that is operational results in the user equipment connecting to a different cellular base station.

5. The method of claim 4, wherein the different cellular base station provides a roaming cellular service network connection due to the disabling of the sector of the cellular base station.

6. The method of claim 4, wherein both the cellular base station and the different cellular base station correspond to the same cellular service provider.

7. The method of claim 4, wherein the different cellular base station provides a strongest cellular connection signal from among a plurality of alternative cellular base stations that remain after disabling the sector of the cellular base station.

8. The method of claim 1, wherein the cellular service network connection is stalled such that the user equipment appears to be connected to a cellular base station while failing to respond to user input at the user equipment.

9. The method of claim 1, wherein the cellular service network connection is formatted according to a protocol that disaggregates the user plane and the control plane.

10. The method of claim 9, wherein the cellular service network connection comprises a 5G cellular service network connection.

11. A system comprising:
at least one processor; and
at least one memory coupled to the at least one processor, the at least one memory having computer-executable instructions stored thereon that, when executed by the at least one processor, cause actions to be performed, the actions including:
checking whether a user plane of a cellular service network connection to a user equipment is operational;
checking whether a control plane of the same cellular service network connection to the user equipment is operational;
determining that one of the user plane and control plane is operational while the other of the user plane and the control plane is not operational such that the cellular service network connection is stalled; and
remediating the cellular service network connection by disabling the one of the user plane and control plane that is operational such that a new cellular service network connection is established;
wherein:
disabling the one of the user plane and the control plane that is operational is performed at a cellular base station to which the user equipment is connected; and
disabling the one of the user plane and the control plane that is operational is performed by disabling a sector of the cellular base station to which the user equipment is connected.

12. The system of claim 11, wherein the system is configured to determine when the user plane of the cellular service network connection to the user equipment is operational and the control plane of the cellular service network connection to the user equipment is not operational such that the cellular service network connection is stalled.

13. The system of claim 11, wherein the system is configured to determine when the control plane of the cellular service network connection to the user equipment is operational and the user plane of the cellular service network connection to the user equipment is not operational such that the cellular service network connection is stalled.

14. The system of claim 11, wherein the system is configured to disable the one of the user plane and the control plane that is operational such that the user equipment connects to a different cellular base station.

15. The system of claim 14, wherein the different cellular base station provides a roaming cellular service network connection due to the disabling of the sector of the cellular base station.

16. The system of claim 14, wherein both the cellular base station and the different cellular base station correspond to the same cellular service provider.

17. The system of claim 14, wherein the different cellular base station provides a strongest cellular connection signal from among a plurality of alternative cellular base stations that remain after disabling the sector of the cellular base station.

18. The system of claim 11, wherein the system is configured to determine when the cellular service network connection is stalled such that the user equipment appears to be connected to a cellular base station while failing to respond to user input at the user equipment.

19. The system of claim 11, wherein the cellular service network connection is formatted according to a protocol that disaggregates the user plane and the control plane.

20. A non-transitory computer-readable medium encoding instructions that, when executed by at least one physical processor of a computing device, cause the computing device to perform a method comprising:
checking whether a user plane of a cellular service network connection to a user equipment is operational;

checking whether a control plane of the same cellular service network connection to the user equipment is operational;

determining that one of the user plane and control plane is operational while the other of the user plane and the control plane is not operational such that the cellular service network connection is stalled; and remediating the cellular service network connection by disabling the one of the user plane and control plane that is operational such that a new cellular service network connection is established;

wherein:

disabling the one of the user plane and the control plane that is operational is performed at a cellular base station to which the user equipment is connected; and disabling the one of the user plane and the control plane that is operational is performed by disabling a sector of the cellular base station to which the user equipment is connected.

* * * * *